United States Patent
Tien

(10) Patent No.: US 9,859,941 B2
(45) Date of Patent: Jan. 2, 2018

(54) PROTECTIVE COVER FOR ELECTRONIC DEVICE

(71) Applicant: HON HAI PRECISION INDUSTRY CO., LTD., New Taipei (TW)

(72) Inventor: Li-Wen Tien, New Taipei (TW)

(73) Assignee: HON HAI PRECISION INDUSTRY CO., LTD., Taipei (TW)

( * ) Notice: Subject to any disclaimer, the term of this patent is extended or adjusted under 35 U.S.C. 154(b) by 110 days.

(21) Appl. No.: 14/460,271

(22) Filed: Aug. 14, 2014

(65) Prior Publication Data

US 2016/0028427 A1    Jan. 28, 2016

(30) Foreign Application Priority Data

Jul. 22, 2014  (CN) .................... 2014 2 4050804 U

(51) Int. Cl.
| | |
|---|---|
| *H04M 1/02* | (2006.01) |
| *A45C 11/00* | (2006.01) |
| *H04M 1/04* | (2006.01) |
| *B65D 85/00* | (2006.01) |
| *H04B 1/3888* | (2015.01) |

(52) U.S. Cl.
CPC .............. *H04B 1/3888* (2013.01); *H04M 1/04* (2013.01)

(58) Field of Classification Search
CPC ....... A45C 11/00; A45C 13/005; B65D 85/00; G06F 1/1628; H04M 1/04; H05K 13/00; H05K 5/0021; H05K 5/0234
USPC ....... 455/575.1–575.3, 575.8; 206/37, 45.24, 206/314
See application file for complete search history.

(56) References Cited

U.S. PATENT DOCUMENTS

| | | | | |
|---|---|---|---|---|
| 8,162,282 | B2 * | 4/2012 | Hu ........................ | F16M 11/041 |
| | | | | 248/447 |
| D663,294 | S  * | 7/2012 | Buxton ........................ | D14/250 |
| 8,428,664 | B1 * | 4/2013 | Wyers .................. | H04M 1/185 |
| | | | | 455/575.1 |
| 8,640,864 | B2 * | 2/2014 | Chen ..................... | G06F 1/1626 |
| | | | | 206/320 |
| 8,714,510 | B2 * | 5/2014 | McCosh ............... | G06F 1/1626 |
| | | | | 206/45.23 |
| 8,757,375 | B2 * | 6/2014 | Huang ................. | A47B 23/043 |
| | | | | 206/320 |
| D712,391 | S  * | 9/2014 | Kim ............................ | D14/250 |
| D715,789 | S  * | 10/2014 | Yoon ............................ | D14/250 |
| D720,736 | S  * | 1/2015 | Chen ............................ | D14/250 |
| D721,066 | S  * | 1/2015 | Yoon ............................ | D14/250 |
| D723,040 | S  * | 2/2015 | Kang ............................ | D14/440 |
| 8,960,421 | B1 * | 2/2015 | Diebel .................. | G06F 1/1679 |
| | | | | 206/320 |
| D726,192 | S  * | 4/2015 | Massucco .................... | D14/440 |
| D743,406 | S  * | 11/2015 | Mecchella .................... | D14/440 |

(Continued)

*Primary Examiner* — Khawar Iqbal
(74) *Attorney, Agent, or Firm* — ScienBiziP, P.C.

(57) ABSTRACT

A protective cover for an electronic device includes a main body having a plurality of edges and an integral frame vertically extending from the plurality of edges of the main body and surrounding the main body. The main body and the integral frame form a first shell and a second shell, and the first shell and the second shell are connected by a flexible connecting portion, so that the second shell is able to rotate outward when the flexible connecting portion is stretched, to form an angle between the second shell and the first shell. Thereby a standing base, is formed to support the electronic device.

7 Claims, 2 Drawing Sheets

(56) References Cited

U.S. PATENT DOCUMENTS

| | | | | |
|---|---|---|---|---|
| D747,706 S | * | 1/2016 | Tien | D14/250 |
| 9,226,559 B1 | * | 1/2016 | Diebel | A45C 11/00 |
| D755,773 S | * | 5/2016 | Kim | D14/250 |
| 9,451,818 B2 | * | 9/2016 | Buechin | A45C 11/00 |
| D774,500 S | * | 12/2016 | Reese | D14/250 |
| 2010/0059649 A1 | * | 3/2010 | Buxton | F16M 13/00 248/371 |
| 2012/0092377 A1 | * | 4/2012 | Stein | F16M 11/041 345/649 |
| 2012/0125791 A1 | * | 5/2012 | Parker | F16M 11/10 206/45.2 |
| 2013/0020216 A1 | * | 1/2013 | Chiou | G06F 1/1626 206/320 |
| 2013/0126365 A1 | * | 5/2013 | Hung | H04M 1/04 206/45.24 |
| 2013/0258586 A1 | * | 10/2013 | Shao | A45C 11/00 361/679.55 |
| 2014/0057685 A1 | * | 2/2014 | Shih | H04M 1/0202 455/575.1 |
| 2014/0128130 A1 | * | 5/2014 | Chiu | H04M 1/185 455/575.8 |
| 2014/0202899 A1 | * | 7/2014 | Murchison | H05K 5/0013 206/320 |
| 2014/0370944 A1 | * | 12/2014 | Green | G06F 1/1626 455/575.1 |
| 2015/0001105 A1 | * | 1/2015 | Nyholm | A45C 11/00 206/45.2 |
| 2015/0108186 A1 | * | 4/2015 | Law | G03B 17/568 224/191 |
| 2015/0244408 A1 | * | 8/2015 | Chen | H04B 1/3888 455/575.8 |
| 2016/0088911 A1 | * | 3/2016 | Tien | A45C 11/00 224/191 |

* cited by examiner

PROTECTIVE COVER FOR ELECTRONIC DEVICE

CROSS-REFERENCE TO RELATED APPLICATIONS

This application claims priority to Chinese Patent Application No. 201420405080.4 filed on Jul. 22, 2014 in the China Intellectual Property Office, the contents of which are incorporated by reference herein.

FIELD

The subject matter herein generally relates to protective covers for electronic devices.

BACKGROUND

A protective cover is usually used for protecting an electronic device. Some protective covers can also be used structurally, for supporting the electronic device when the electronic device is in use.

BRIEF DESCRIPTION OF THE DRAWINGS

Implementations of the present disclosure will now be described, by way of example only, with reference to the attached figures.

DETAILED DESCRIPTION

Figure 1:
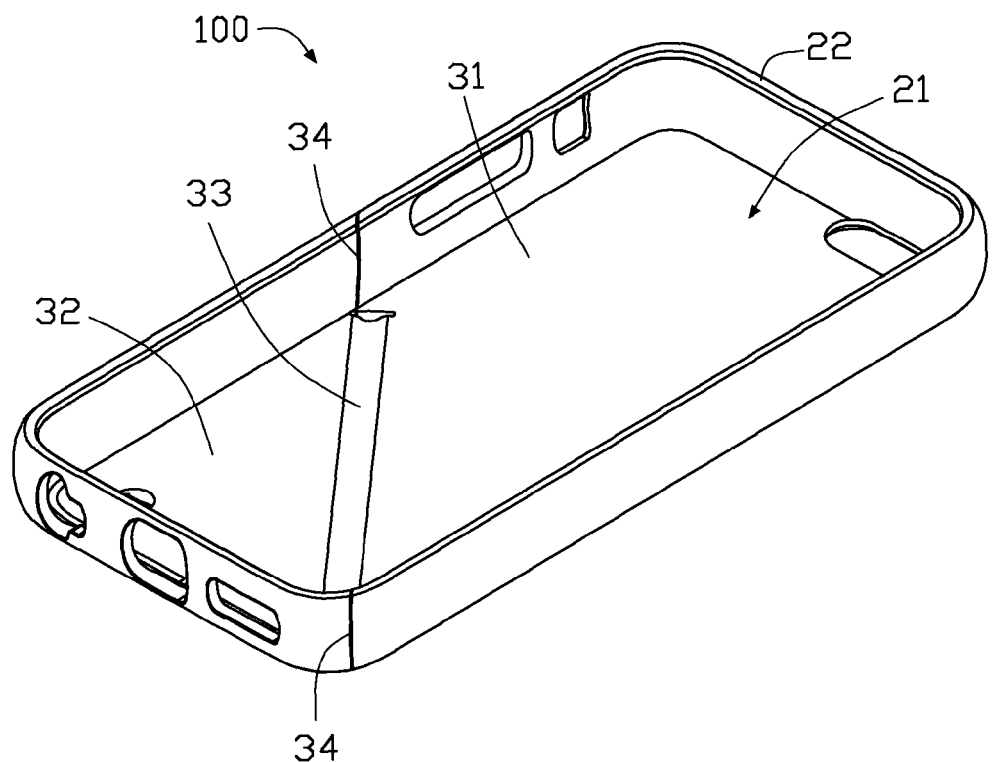
FIG. 1 is an isometric view of a protective cover for an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series and the like.

FIG. 1 shows a protective cover 100 for an electronic device (not shown). The cover 100 includes, but is not limited to, a main body 21 having a plurality of edges and an integral frame 22 vertically extending from the plurality of edges of the main body 21 and surrounding the main body 21. In the embodiment, the integral frame 22 can grip edges of the electronic device.

In the embodiment, the main body 21 and the integral frame 22 form a first shell 31 and a second shell 32, and the first shell 31 and the second shell 32 are connected by a flexible connecting portion 33. In the embodiment, the flexible connecting portion 33 is a flexible crease formed on the main body 21. In the embodiment, the flexible crease is formed to be an arcing groove in an internal surface of the main body 21. The flexible connecting portion 33 is made of thermoplastic polyurethane (TPU) material.

Figure 2:
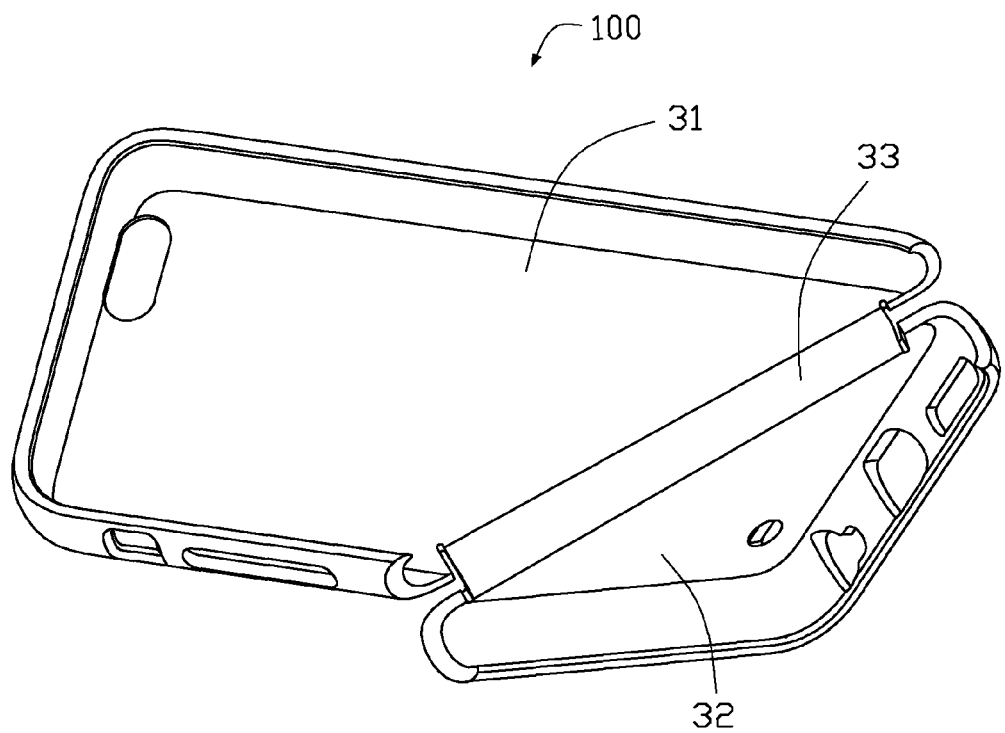
FIG. 2 is an isometric view of the protective cover of FIG. 1 in use.

In use, as shown in FIG. 2, the second shell 32 is able to rotate outward when the flexible connecting portion 33 is stretched, to form an angle between the second shell 32 and the first shell 31. Thereby a standing base, is formed to laterally or longitudinally support the electronic device which it holds.

Referring to FIG. 1, slits 34 are formed on the integral frame 22 and are located between the first shell 31 and the second shell 32, to make separating and stretching the second shell 32 from the first shell 31 with an easier operation.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size, and arrangement of parts within the principles of the present disclosure, up to and including the full extent established by the broad general meaning of the terms used in the claims.

What is claimed is:

1. A protective cover comprising:
a main body having a plurality of edges; and
an integral frame vertically extending from the plurality of edges of the main body and surrounding the main body;
wherein the main body and the integral frame form a first shell and a second shell, slits are formed on the integral frame and located between the first shell and the second shed to make separating and stretching the second shell from the first shell, and the first shell and the second shell are connected by a flexible connecting portion, the flexible connecting portion linearly and obliquely intersects with two adjacent edges of the main body, so that the second shell is able to rotate outward when the flexible connecting portion is stretched, to form an angle between the second shell and the first shell, thereby a standing base is formed to support an electronic device;
wherein the plurality of edges includes a left edge, a right edge, a top edge, and a bottom edge connecting in series;
wherein the integral frame includes a left frame, a right frame, a top frame, and a bottom frame connecting in series, and four corners are formed there between on the integral frame;
wherein the left frame extends from the left edge, the right frame extends from the right edge, the top frame extends from the top edge, and the bottom frame extends from the bottom edge;
wherein a first slit of the slits is formed by obliquely cutting the left frame which is vertically extending from the left edge of the main body, and a second slit of the slits is formed by cutting a right bottom corner of the four corners;
wherein the first slit is located at a first end of the flexible connecting portion, and the second slit is located at a second end of the flexible connecting portion, the first slit and the second slit cooperate the flexible connecting portion to separate and stretch the second shell from the first shell.

2. The protective cover as described in claim 1, wherein the flexible connecting portion is a flexible crease formed on the main body.

3. The protective cover as described in claim 2, wherein the flexible connecting portion is formed to be an arcing groove in an internal surface of the main body.

4. The protective cover as described in claim 3, wherein the flexible connecting portion is made of thermoplastic polyurethane material.

5. The protective cover as described in claim 1, wherein the first slit is formed by cutting a half of the left frame.

6. The protective cover as described in claim 1, wherein the bottom frame includes three through holes, and the left frame includes two through holes.

7. The protective cover as described in claim 1, wherein the main body includes a first hole and a second hole, the first hole is located on the first shell, and the second hole is located on the second shell.

* * * * *

UNITED STATES PATENT AND TRADEMARK OFFICE
CERTIFICATE OF CORRECTION

PATENT NO. : 9,859,941 B2
APPLICATION NO. : 14/460271
DATED : January 2, 2018
INVENTOR(S) : Li-Wen Tien Page 1 of 1

It is certified that error appears in the above-identified patent and that said Letters Patent is hereby corrected as shown below:

On the Title Page

Please replace Item (30) regarding "Foreign Application Priority Data" with the following:
(30) Foreign Application Priority Data
Jul. 22, 2014 (CN) .........................201420405080.4

Signed and Sealed this
Fourth Day of December, 2018

Andrei Iancu
*Director of the United States Patent and Trademark Office*